United States Patent [19]

Brewer

[11] 4,222,616
[45] Sep. 16, 1980

[54] ENDPLAY CONTROL GUSSET

[75] Inventor: Thomas D. Brewer, Tremont, Ill.

[73] Assignee: Caterpillar Tractor Co., Peoria, Ill.

[21] Appl. No.: 4,794

[22] Filed: Dec. 18, 1978

[51] Int. Cl.³ .............................................. B62D 55/20
[52] U.S. Cl. .................................... 305/54; 305/58 R
[58] Field of Search ...................... 305/54, 56, 57, 39,
305/58 R; 74/245 LP, 245 R, 245 C, 247, 250 R; 180/9.2 R, 9.6 Z

[56] References Cited

U.S. PATENT DOCUMENTS

| | | | |
|---|---|---|---|
| 1,487,416 | 3/1924 | Whitlock | 305/54 |
| 3,336,088 | 8/1967 | Bauer, Jr. | 305/54 |
| 3,416,846 | 12/1968 | Eastman | 305/54 |
| 3,537,760 | 11/1970 | Kimura et al. | 305/54 |
| 4,058,350 | 11/1977 | Russo | 305/56 X |

Primary Examiner—David A. Scherbel
Attorney, Agent, or Firm—Wegner, Stellman, McCord, Wiles & Wood

[57] ABSTRACT

An endplay control gusset for use in a tractor track structure (11) or the like wherein a shoe (13) is secured to a pair of spaced links (14,15) having pins (32) extending therebetween and supporting rollers (33) for engaging the sprockets (12) of the tractor (10). The gussets (24,25) are secured to the shoes outboard of the links and engage the outer faces (26,27) of the links so as to effectively prevent outward deflection of the links. The shoes may be secured to the links by bolts (16,17). The gussets may be formed integrally with the shoes or may be secured thereto as by welding (29), as desired. The links may define annular bosses (30,31) receiving the ends (32a) of the pins and the gussets may engage the bosses at a position spaced substantially from the shoe.

8 Claims, 4 Drawing Figures cription

ENDPLAY CONTROL GUSSET

DESCRIPTION

1. Technical Field

This invention relates to tractor track structures and in particular to means for stabilizing the links against outward deflection in such track structures.

2. Background Art

In U.S. Pat. No. 1,192,423 of C. A. Henneuse, a tractor is shown having means for locking the track pin against axial play. The retaining means comprise angle sections secured to the baseplate which partly overlie the ends of the track pins.

In one improved form of track construction, a support is extended through suitable aligned openings of the spaced links and includes outboard end portions to which the outboard ends of the shoes of the track are secured as by suitable bolts. The support is secured to the link by bolts extending through the shoe and a top edge portion of the links into the portion of the support extending through the aligned openings of the links.

U.S. Pat. No. 3,101,221 of John S. Waddell discloses a track assembly wherein ears are welded to the shoe for overlying the ends of the track pin to prevent axial and rotative movement of the pin.

DISCLOSURE OF INVENTION

The present invention comprehends an improved tractor track structure wherein gussets are provided on the shoes outboard of the spaced links for effectively preventing outward deflection of the links during use in the tractor.

The gussets may be formed integrally with the shoes or may be secured thereto as desired.

The gussets define inner faces engaging the outer surfaces of the links to maintain the links against spreading deformation in the assembly.

The shoes are secured to the links by suitable bolt means extending through an edge portion of the links, with a portion of the bolt means being received in aligned openings of the links.

The track pins extend between the spaced links and have end portions received in the links, and more specifically, received in outwardly projecting annular bosses of the links. The gussets may engage the bosses at a position spaced from the shoe to provide an improved positive retention of the links against outward spreading deformation.

The gussets may define thin wall members extending flatwise outwardly away from the links and perpendicular to the shoes and link outer surfaces.

The gussets may extend substantially tangentially and outwardly of the ends of the pins in overlying the annular bosses receiving the pin ends.

The improved tractor track structure of the present invention is extremely simple and economical of construction while yet providing a highly improved low maintenance, high useful life to the track structure in effectively preventing undesirable outward deflection of the links during use.

BEST MODE FOR CARRYING OUT THE INVENTION

Figure 1:
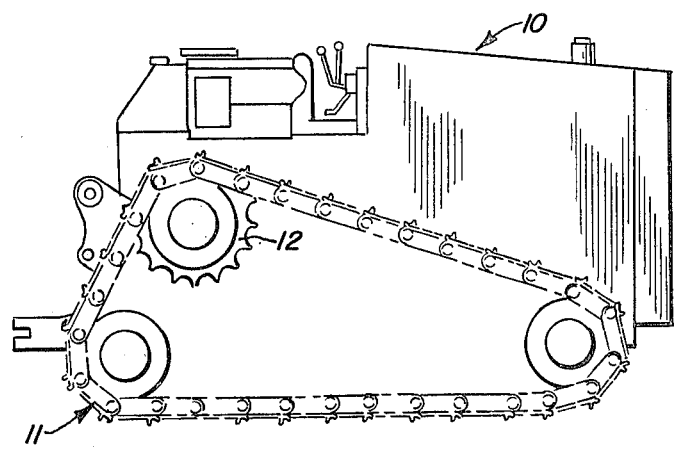
FIG. 1 is a side elevation of a tractor having a track structure embodying the invention.

In the exemplary embodiment of the invention as disclosed in the drawing, a tractor generally designated 10 is provided with a track structure generally designated 11 entrained over suitable sprockets, including a drive sprocket 12, for propelling the tractor over the terrain. To provide improved driving engagement with the subjacent earth, the track structure is provided with shoes 13 secured to a pair of spaced links 14 and 15 as by forward bolts 16 and rearward bolts 17 extending through the shoe and an edge portion 18 into a pair of openings 19 and 20 of each shoe.

Figures 3, 3A:
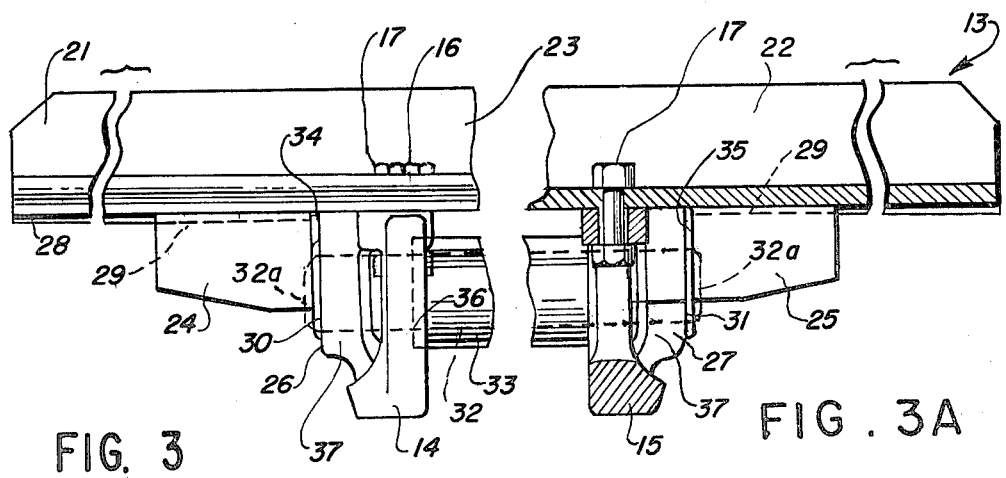
FIG. 3 is a fragmentary end elevation of a portion of the track structure.
FIG. 3A is a sectional view taken along line 3A—3A of FIG. 3.

As seen in FIG. 3, the shoe includes outboard portions 21 and 22 which extend substantially outwardly from the links 14 and 15. Each shoe includes an upstanding cleat 23 which, as seen in FIG. 3, extends substantially the full width of the shoe. Bolts 16 and 17, together with the interference fit between the track chain components, retain links 14 and 15 in parallel spaced relationship, as seen in FIG. 3. However, it has been found that the substantial leverage afforded by the substantial outboard extensions of shoe portions 21 and 22 tends to cause the links to deflect in a spreading manner during rough usage of the tractor, as the links are supported only by the relatively closely spaced bolts 16 and 17. The present invention comprehends an improved structure which effectively avoids such spreading deformation of the links and thereby provides a substantially improved, long troublefree life of the track structure.

Figure 2:
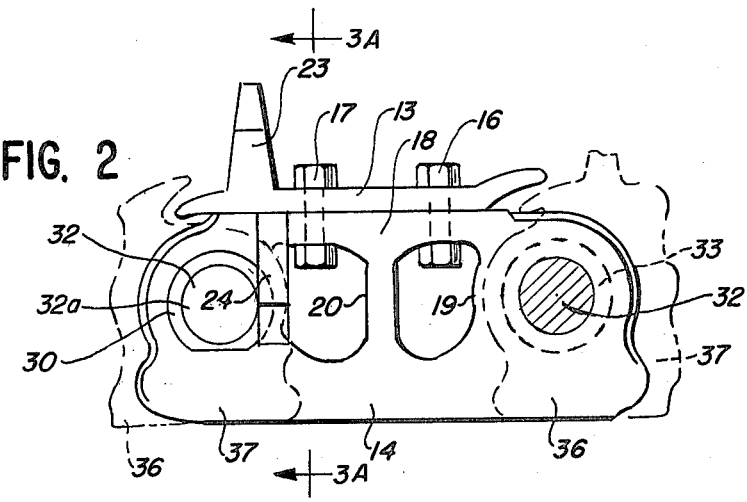
FIG. 2 is a fragmentary side elevation of a portion of the track structure.

More specifically, the invention comprehends providing a pair of gussets 24 and 25 depending from the outboard portions 21 and 22 of the shoes so as to be disposed outboard of the outer surfaces 26 and 27 of the links. In the illustrated embodiment, as shown in FIG. 2 and in full lines in FIG. 3, the gussets are formed integrally with the shoes 13. Alternatively, as shown in dotted lines in FIG. 3, the gussets may be secured to the bottom surface 28 of the shoe by suitable welds 29.

The outer faces 26 and 27 of the respective links 14 and 15 may define outwardly extending annular bosses 30 and 31. Extending between the links is a track pin 32 having its opposite ends received within the bosses 30 and 31. Mounted on the track pin is a conventional track bushing 33 which extends between the links and, thus, effectively precludes inward deflection of the links.

Gusset 24 defines an inner face 34 and gusset 25 defines an inner face 35. As seen in FIGS. 2 and 3, inner faces 34 and 35 overlie the annular bosses 30 and 31 so that the gussets engage the links 14 and 15 at positions spaced substantially from the shoe 13 for improved positive prevention of outward spreading deflection of the links. As seen in FIG. 2, the gussets extend effectively tangentially to the ends of the pins 32 and extend perpendicularly outwardly away from the links. As further shown in FIG. 2, the gussets may extend perpendicularly to the flat extent of the shoe. The gussets may have a height a major portion of the height of the link.

As shown, the gussets may have facial engagement with the bosses without being fixedly secured thereto for further improved support of the link.

As seen in FIG. 1 and as illustrated in broken lines in FIG. 2, the forward portion 36 of each link is turned somewhat inwardly so as to be received between the rear portions 37 of the preceding link. Similarly, the rear portions 37 of the links may receive therebetween the forward portions 36 of the succeeding link in making up the continuous track. Thus, in effect, the gussets 24 and 25 effectively maintain the rear portion 37 of one pair of links and the front portion 36 of the succeeding pair of links against the undesirable spreading action discussed above.

The gussets may be flat wall structures as the thrust thereagainst is perpendicular to their flatwise extent in maintaining the links against outward spreading deflection. As seen in FIG. 3, the gussets have relatively short length so as to provide the improved reinforcing and strengthening function with minimum additional weight in the track structure.

To further minimize the weight of the gussets, the gussets may be tapered outwardly, as seen in FIG. 3.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a tractor track structure (11) having a pair of parallel spaced links (14,15) defining outer surfaces (26,27) and edge portions (18), a pin (32) extending between said links and having opposite ends (32a) secured thereto, a shoe (13), and securing means (16,17) for securing said shoe to said edge portions of the links, said shoe having outer portions (21,22) extending substantially outwardly of said link outer surfaces, the improvement comprising a pair of gussets (24,25) carried by said shoe outer portions one each outwardly of the respective ones of said pair of links and each having an inner face (34,35), said inner faces being juxtaposed to said outer surfaces (26,27) of the associated link with said gussets extending substantially tangentially to said ends of said pin whereby said gusset inner faces effectively prevent outward deflection of said links at said pin while permitting free access to the pin ends for servicing and replacement thereof.

2. In a tractor track structure (11) having a pair of parallel spaced links (14,15) defining outer surfaces (26,27), coaxially aligned openings opening through said outer surfaces and edge portions (18), a pin (32) extending between said links and having opposite ends (32a) secured to said links in said openings, a bushing coaxially on said pin and extending between said links to prevent inward deflection of said links at said openings, a shoe (13), and securing means (16,17) for securing said shoe to said edge portions of the links, said shoe having outer portions (21,22) extending substantially outwardly of said link outer surfaces, the improvement comprising a pair of gussets (24,25) carried by said shoe outer portions one each outwardly of the respective ones of said pair of links and each having an inner face (34,35), said inner faces being juxtaposed to said outer surfaces (26,27) of the associated link adjacent said openings to have at least a portion of the gusset aligned with said bushing whereby said gusset inner faces effectively prevent outward deflection of said links at said openings while permitting free access to the pin ends for servicing and replacement thereof.

3. The track structure of claim 1 or 2 wherein said gussets (24,25) are formed integrally with said shoe (13).

4. The track structure of claim 1 or 2 wherein said gussets (24,25) define wall members extending flatwise perpendicularly to said shoe (13).

5. The track structure of claim 1 or 2 wherein said gussets (24,25) define flat wall members extending perpendicularly to said links (14,15).

6. The track structure of claim 1 or 2 wherein said gussets (24,25) are welded to said shoe (13).

7. The track structure of claim 1 or 2 wherein said links (14,15) define outwardly projecting bosses (30,31) receiving the outer ends (32a) of said pin (32), said gusset inner faces (34,35) engaging said bosses.

8. The track structure of claim 1 or 2 wherein said gusset inner faces (34,35) engage said link outer faces (26,27) only at positions spaced substantially from said shoe (13).

* * * * *